United States Patent [19]

Klein

[11] 3,980,909
[45] Sept. 14, 1976

[54] UNIVERSAL AND D.C. MOTORS WITH IMPROVED FIELD STRUCTURE FOR PORTABLE TOOLS AND APPLIANCES

[75] Inventor: Henry Klein, Baltimore, Md.

[73] Assignee: The Black and Decker Manufacturing Company, Towson, Md.

[22] Filed: Aug. 1, 1972

[21] Appl. No.: 277,090

[52] U.S. Cl. ............................... 310/50; 310/258
[51] Int. Cl.[2] .............................................. H02K 7/14
[58] Field of Search ......... 310/50, 47, 40 MM, 217, 310/218, 254, 258, 259

[56] References Cited
UNITED STATES PATENTS

| | | | |
|---|---|---|---|
| 2,095,956 | 10/1937 | Bess | 310/50 |
| 2,136,301 | 11/1938 | Hoddy | 310/218 |
| 2,298,388 | 10/1942 | Knobel | 310/218 |
| 2,532,823 | 12/1950 | Schumann | 310/50 |
| 2,792,512 | 5/1957 | Koch | 310/258 |
| 2,939,021 | 5/1960 | Gilchrist | 310/217 |
| 2,987,636 | 6/1961 | Jepson | 310/50 |
| 3,119,942 | 1/1964 | Luther | 310/47 |
| 3,121,813 | 2/1964 | Pratt | 310/50 |
| 3,304,358 | 2/1967 | De Jean | 310/258 |

Primary Examiner—R. Skudy
Attorney, Agent, or Firm—Edward D. Murphy; Leonard Bloom

[57] ABSTRACT

A small motor, for either universal or D. C. applications and useful in the fractional horsepower range, is described. The motor includes a wound armature, commutator and brushes, and a two pole wound field. The motor may be of the series, shunt or compound type. An improved field structure which utilizes an improved cross sectional shape is disclosed.

25 Claims, 10 Drawing Figures

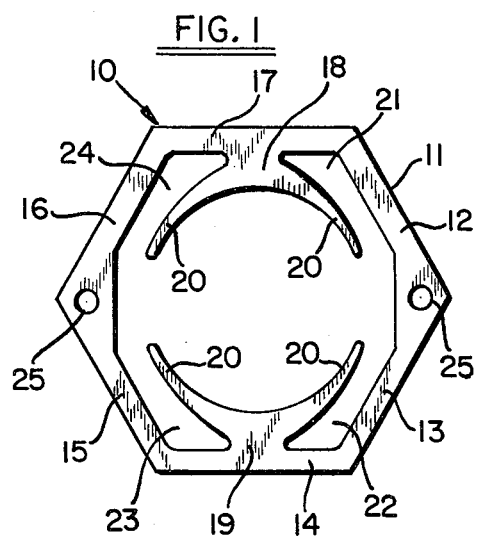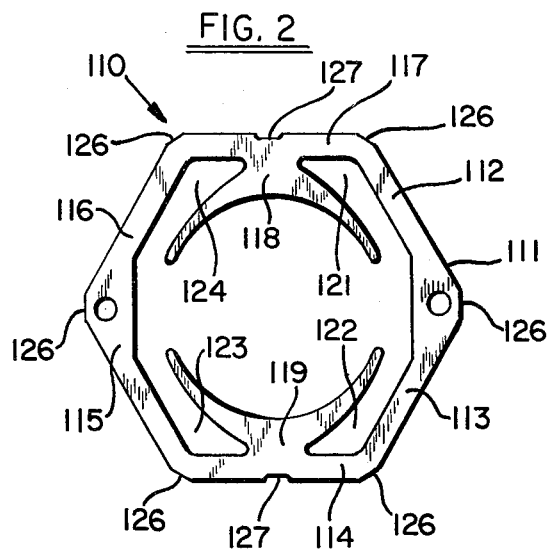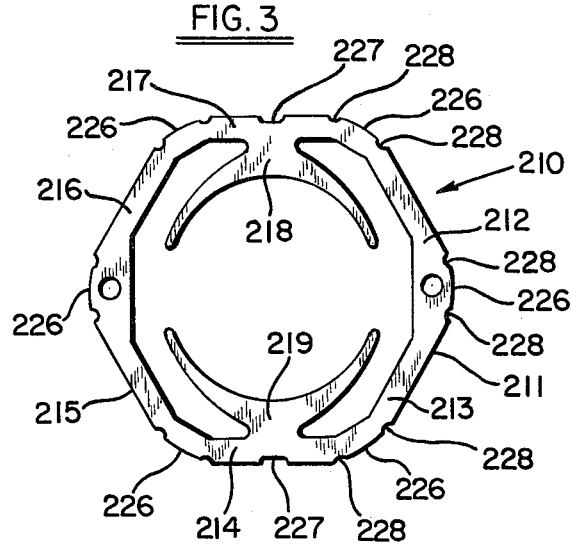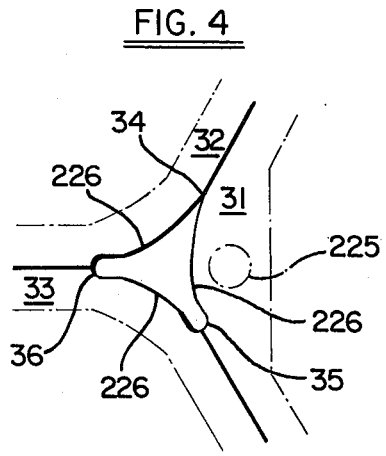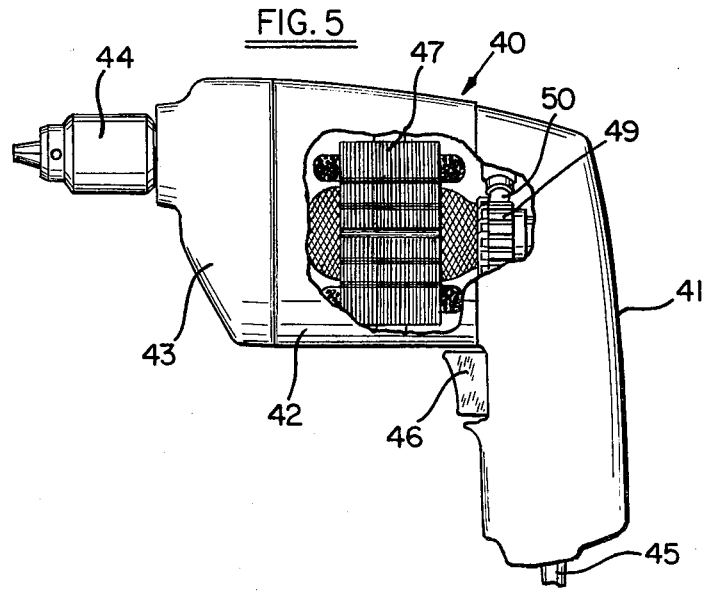

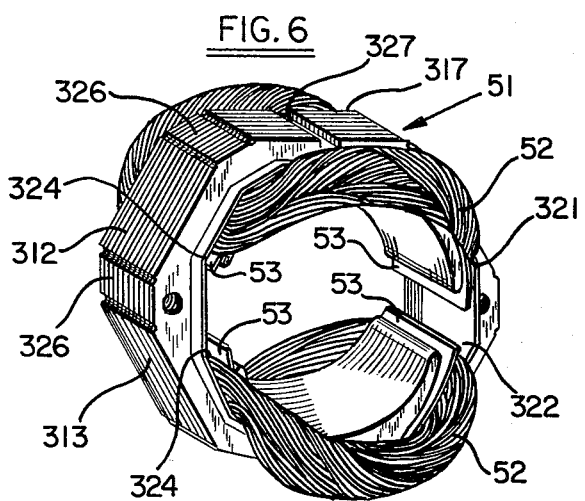
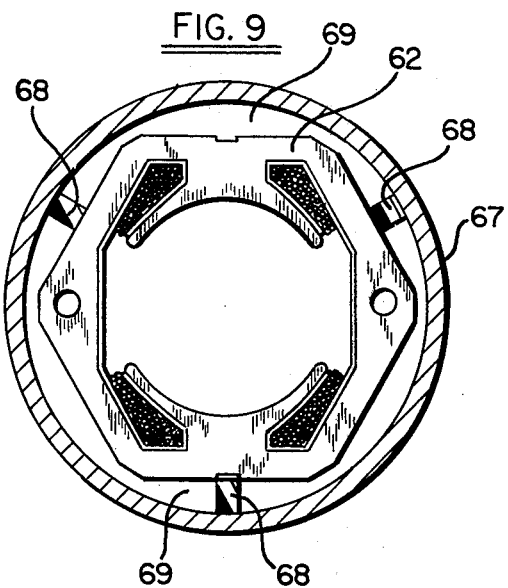
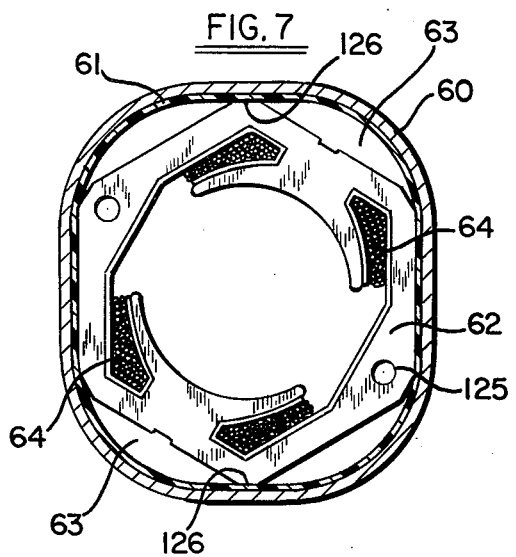
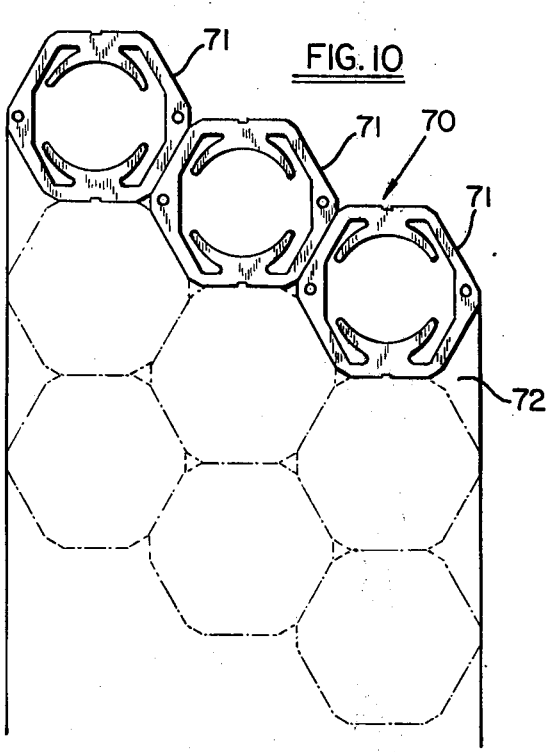
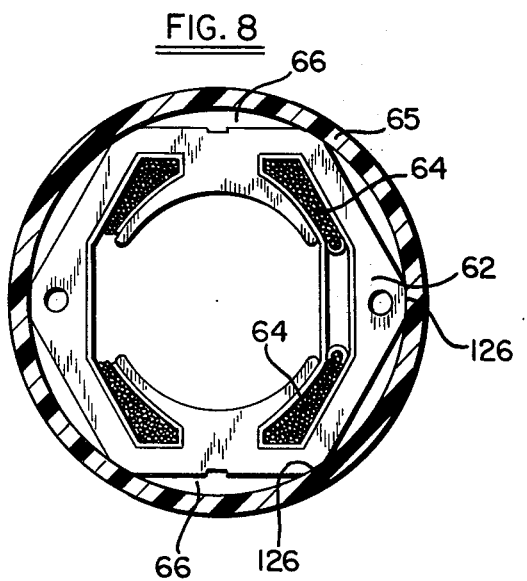

UNIVERSAL AND D.C. MOTORS WITH IMPROVED FIELD STRUCTURE FOR PORTABLE TOOLS AND APPLIANCES

FIELD OF THE INVENTION

This invention relates broadly to electric motors and specifically to the field structure of fractional horsepower D.C. and universal motors of the commutator type. Such motors are commonly used in small portable power tools and appliances.

BACKGROUND

The design and construction of electric motors is a very highly developed and mature art. An extensive variety of motor configurations, including both basic modifications of the design concept and less drastic but no less significant modifications of the design parameters have been used. Within this context, modifications which produce even minor improvements in performance, size or cost are difficult to achieve.

A further aspect of the context of this invention is that the motor designs previously utilized have presented difficulties in terms of the practical utility of the motor. Particularly in portable motor-driven devices, but also in other applications, the motor is mounted in a structure which must serve as an adequate housing for the motor and simultaneously as the exterior surface which is used, handled and carried by the operator. Appliances presently available are frequently compromises which sacrifice either motor performance or practical utility or both.

Presently known motor designs have been developed from the original designs made for use with hand-inserted coils. Although modern designs have been adapted to automatic winding equipment and although extensive efforts have been made to improve the efficiency of motors, including efficiencies of power, space, steel or wire usage, and mounting, these efforts have not produced the improvements desired. In general, the motors resulting have been approximately square or rectangular, resulting in poor space, steel usage and mounting efficiencies, or round, resulting in poor power, wire usage and mounting efficiencies. The present invention is directed to a conceptually new design for these motors which permits substantial improvement in all of these categories, and to an improved class of power tools incorporating this design.

It is, accordingly, an object of this invention to provide a new and improved universal or D.C. motor for use in electric power tools and appliances.

It is also an object of this invention to provide new and improved tools and appliances permitted by an improved electric motor construction.

Another object of this invention is the provision of a new and improved field for two pole wound universal or D.C. motors.

A further object of this invention is the provision of a new and improved field lamination for use in universal or D.C. electric motors, particularly for power tools.

It is also an object of this invention to provide a new and improved two pole universal or D.C. motor which is readily accommodated within a smaller housing without adversely affecting motor performance.

Another object of this invention is the provision of a new and improved universal or D.C. motor which is easily mounted in a variety of housing configurations.

It is also an object to provide a two pole universal or D.C. motor field which enable maximum performance to be obtained from a given motor size.

A further object of the provision of a new and improved field lamination for a two pole electric motor which may be mounted in housings of preferred external configuration without loss of performance.

It is a specific object of this invention to provide an improved field for use in a light-weight, hand-held appliance having an electric motor in an enclosure driving an output shaft, the motor being of the type having a two-pole wound field and a commutated armature. The improved field includes a substantially hexagonal yoke structure surrounding the armature and a pair of poles disposed within the yoke structure at diametrically opposed locations. Each of the poles is located in the center of one side of the hexagonal yoke structure and a pair of pole tips extends from each of the poles so that a winding slot is defined between each of the pole tips and the portion of the yoke structure adjacent thereto.

Another specific object of this invention is an improvement in two-pole wound fields of the type used in light-weight, hand-held appliances including an enclosure, an electric motor within the enclosure driving an output shaft and a commutated armature associated with the field, wherein the improved field includes a substantially hexagonal yoke structure surrounding the armature and a pair of poles disposed within the yoke structure at diametrically opposed locations. Each of the poles is located in the center of one side of the hexagonal yoke structure. A pair of pole tips extends from each of the poles and a winding slot is defined between each of the pole tips and the portion of the yoke structure which is adjacent thereto. Each of the poles includes a throat portion between the yoke structure and the pole tips, and the throat portion has a minimum thickness between the bottoms of the winding slots of approximately twice the width in cross section of the yoke structure.

It is also a specific object of this invention to provide an improved two-pole wound field motor of the type using a commutated armature and adapted for use in a light-weight, hand-held appliance wherein the motor is placed within an enclosure and drives an output shaft, the improved motor including a field having a substantially hexagonal yoke structure surrounding the armature and a pair of poles disposed within the yoke structure at diametrically opposed locations. Each of the poles is located in the center of one side of the hexagonal yoke structure and a pair of pole tips extends from each of the poles. A winding slot is defined between each of the pole tips and the portion of the yoke structure which is adjacent thereto. Each of the portions of the yoke structure which is adjacent a respctive winding slot includes one of the corners defined between the sides of the hexagonal yoke structure so that each of the winding slots includes the additional area provided by the corner. The corner is located within the lower half of the arcuate length of the winding slot as measured from the bottom of the slot outwardly toward the end of the pole tip.

Further objects and advantages will become apparent as the description and illustration of this invention proceed.

In the drawings:

FIG. 1 is a schematic illustration of an idealized field lamination for use in the motor of the present invention;

FIG. 2 is an illustration of a modified field lamination in accord with the present invention;

FIG. 3 is an illustration of a field lamination in accordance with the preferred embodiment of this invention;

FIG. 4 is a partial illustration of a steel strip which shows the manner in which the lamination of FIG. 3 is punched;

FIG. 5 is a side elevation of a power tool with part of the housing broken away to show a motor in accord with this invention;

FIG. 6 is a perspective view of a field sub-assembly in accord with the preferred embodiment of this invention;

FIGS. 7, 8 and 9 are vertical cross sectional views illustrating the mounting of field sub-assemblies in accord with this invention in a variety of housings; and FIG. 10 is a schematic illustration of a steel strip which illustrates an improved method of producing laminations in accord with this invention.

Wound universal or D.C. motors utilize a field structure and an armature and means for passing current through these parts so that the current in the armature interacts with flux lines from the field to cause relative rotation. The armature includes a group of wound coils connected to a commutator; brushes provide for conduction of current to and from these coils. The field structure includes a plurality of magnetic pole-producing members and a coil of wire on each of these members. The present invention is specifically directed to motors having two poles; that is, two magnetic pole-producing members with a coil of wire on each member. Depending on the exact application, these coils may be connected in series with the armature to form a universal motor, or in shunt or in some combination of series and shunt for D.C. use. In any of these structures, the field structure comprises a stack of thin sheet metal laminations, usually punched from a strip of sheet steel. Each lamination, and also the assembled stack of laminations, includes a surrounding ring portion called the yoke, inwardly extending portions called poles; and fingers extending from the poles called pole tips. The inner surface of the pole tips is approximately circular to conform generally to the shape of the armature; this may be varied slightly as is known in the art. The coils of wire are wound in slots defined between the pole tips and the adjacent portion of the yoke. The present invention is directed to motors of this general type which include two poles located at diametrically opposed positions on the yoke.

In the context of this type of motor, the present invention includes a field sub-assembly for two pole D.C. or universal motors wherein each individual lamination, and thus also the stack of assembled laminations, includes a substantially hexagonal yoke and wherein the pole members are disposed in the center of two opposed sides of the hexagonal yoke. This construction permits substantial improvements to be achieved, both in the performance characteristics of the motor and in the utilization of the motor in a practical tool embodiment. Some of these improvements and the manner in which they are achieved are set forth in the following detailed description.

FIG. 1 is an illustration of a lamination shaped in accordance with the precise terms of this invention. The lamination 10 includes a surrounding yoke 11 which is made up of six equal sides, 12–17, which are disposed at included angles of 120° to the adjacent sides. The poles 18 and 19 include throat portions which are disposed in the center of two opposing sides 14 and 17. Pole tips 20 extend from the throats for appropriate flux distribution through an armature which, in the completed motor, will rotate within the bore enclosed by the poles and pole tips. Winding slots for receiving the field coils are formed between each of the pole tips and the parts of the yoke adjacent to the pole tips; these are identified by the numerals 21–24. To complete a field sub-assembly for an electric motor, a plurality of these laminations are placed in a stack and the field coils are wound in the slots as will be illustrated hereinafter. Holes 25 may be provided for mounting bolts if desired.

The lamination of FIG. 1 is an idealized shape in that the external configuration of the lamination is exactly a perfect hexagon. In actuality, the motor laminations may depart somewhat from this precise configuration, although the essence of the hexagonal shape is retained. For example, the lamination 110 shown in FIG. 2 is essentially the same as the lamination 10 shown in FIG. 1 but it includes two modifications. First, at each intersection of the hexagonal sides of the yoke 111, such as the intersection of sides 117 and 112, a flat 126 is provided to enable the motor formed from these laminations to be mounted within another housing. A second modification is that notches 127 are formed in each of the sides 117 and 114. When the laminations are assembled into a stack, these notches provide a channel along which the stack is welded into a unitary assembly. As is conventional, the channel improves the strength of the weld and provides a location for the welding material so that it does not protrude beyond the level of the sides 117 and 114. However, despite these modifications, the lamination 110 also substantially embodies the novel characteristics of hexagonal shape and side-centered poles. The sides 112–117 are disposed at included angles of 120° and the effective length of the sides is equal. Again, the winding slots 121–124 are defined between the pole tips 120 and the portions of the yoke adjacent the tips which include internal corners.

FIG. 3 illustrates a preferred embodiment of this invention. The lamination 210 also consists of six sides 212–217 which form yoke 211, and poles 218 and 219 are centered within the sides 217 and 214, respectively. Notches 227 are provided in the sides 214 and 217 for the same purpose as notches 127 in FIG. 2.

The FIG. 3 embodiment includes rounded corners 226 at each exterior intersection of the hexagonal boundary of the yoke. The corners 226 lie on a circle concentric with the bore inside the pole tips. This enables this particular embodiment to be fitted within a rounded housing. Since the punching of these laminations involves the production of multiple laminations across the width of a single steel strip, the formation of exactly rounded corners would require the use of an extremely narrow punch member which would be subject to rapid wear. To illustrate this problem, FIG. 4 shows the adjacent corners of three laminations 31, 32, 33 being punched simultaneously from a steel strip. At 34, a continuation of the arc of corners 226 to intersection with the yoke sides of laminations 31 and 32 would, if actually done, require that a very narrow portion be punched out. To avoid this and thus increase the life of the punch apparatus, the ends of all three arcs are actually relieved as illustrated at 35 and 36. These reliefs cause the formation of small notches 228 adjacent each of the rounded corners 226 in FIG. 3.

Again, it is noted that the essential configuration of lamination 210 shown in FIG. 3 utilizes a hexagonal yoke 211 with six equal sides and with two pole members 218 and 219 centered in opposing sides.

A representative electrically driven device having a motor including the lamination shown in FIG. 3 is illustrated in FIG. 5. Although the particular device is a drill 40, the motor of this invention may obviously be used in any of the many applications of small electric motors. In accord with conventional practice, the drill 40 includes a handle 41, a motor housing 42, a gear case 43 and a chuck 44. Electric power is supplied via a cord set 45 through a trigger switch 46 to the motor 47. The motor includes an armature 48 having suitable windings thereon, the windings being connected to a commutator 49 and electrical current is conducted through the armature windings by means of brushes, one of which is illustrated at 50.

In accord with the present invention, the motor 47 includes a field sub-assembly 51 which is made up of a stack of laminations, each of which corresponds to that shown at 210 in FIG. 3. In the plan view of FIG. 5, each of the laminations is seen from an edge, for example, from the top of FIG. 3. Thus, the side portions 312 and 313, corresponding to the sides 212 and 213 of each lamination, and three of the rounded corners 326, corresponding to the lamination corners 226 can be seen in FIG. 5. Suitable wiring connections are made in the conventional manner between the field coils 52, the brushes 50, and the internal contacts in the trigger switch 46; these connections have been omitted from FIG. 5 for clarity. The field coils 52 have been cut away to show the armature 48.

The field sub-assembly 51 of FIG. 5 is shown more clearly in FIG. 6 wherein 300-series numbers are used to identify portions of the stack which correspond to specific portions of the lamination 210, the last two digits being the same. In addition, this view shows the insulating slot liners 53 which are inserted into the slots 321-324 in the stack and the coils 52 which are wound in the slots.

The foregoing description sets forth several embodiments of the essential concept of this invention, namely, the lamination and field stack construction wherein the yoke is substantially hexagonal and each of the two poles is disposed so that the slots are bounded by a portion of the yoke which includes a corner. This construction represents a significant advance over previous field constructions for several reasons. For example, a relatively recent construction uses a circular yoke. This construction, while advantageous in several respects such as minimizing the motor outside diameter, provides only minimal available space for the field coils. This limits the motor performance in such areas as torque obtainable from a given armature and commutator sparking. Motor cooling is also more difficult because of the absence of available cooling passages around and within the yoke structure. On a practical utilization level, this lamination may also present difficulties in that it is awkward to provide a secure mounting means within the outside diameter of the yoke since all of the area within that diameter is already occupied by necessary motor elements. Older, more conventional yoke structures require substantially more steel and actually exhibit even poorer performance. They also require large housings, thus increasing the cost and decreasing the ease of using the device.

In contrast, the hexagonal yoke and centered pole structure of the present invention overcomes all of these disadvantages without significantly changing the primary advantage of the circular lamination, namely, the fact that its outside diameter is minimum. For example, simply substituting a field made up of hexagonal laminations for one made up with circular laminations and using the identical armature and brush rigging has been found to permit a 10% increase in maximum watts output with the same no-load speed; substantially improved commutation also resulted.

Another aspect of the present invention which is of importance in terms of the practical utilization of electric motors, particularly in portable appliances such as power tools, is the ease with which motors constructed in accordance with this invention may be mounted within closely-fitted housings while still leaving adequate provision for such necessary aspects as mounting bolts and cooling air passages. FIGS. 7, 8 and 9 illustrate several possible alternatives. For example, in FIG. 7, a metal housing 60 is provided with an internal insulating liner 61 (of course, the housing itself could be of insulating material) and a hexagonal field 62, made up of laminations such as those shown in FIG. 2 is precisely fitted within the liner. The stack includes the holes 125 for mounting bolts; adequate room for these holes is provided in the lamination without unnecessarily extending the area of steel required for each lamination. The hexagonal configuration of the lamination also provides for a very tight fitting and stable mounting of the field along two sides and, at the top and bottom, on two of the flatted corners 126; at the same time, the shape automatically provides passages 63 which guide cooling air over the end turns of the coils 64.

FIG. 8 discloses another alternative mounting arrangement wherein the outer housing 65, of insulating material, is circular and has an inside diameter matched to the corners 126 of the field 62. Once again it can be seen that the hexagonal field configuration permits a very compact and convenient mounting arrangement which provides cooling passages 66 for directing the air flow over the end turns of the coils 64.

FIG. 9 discloses another possible alternative wherein the field 62 is supported within a housing 67 of either metal or plastic by means of bosses 68 which engage any appropriate flat location on the exterior of the field 62. As in the previous embodiments, the field is neatly accommodated within an easily fabricated housing and, once again, cooling passages 69 are provided for directing the air flow over the end turns. In any of these embodiments, other open segments around the field may be blocked by baffles to concentrate the air flow as desired.

Reference has been made hereinbefore to the efficient use of material permitted by the lamination of the present invention. In essence, this results from a novel method of forming laminations which is a further aspect of this invention. FIG. 10 illustrates a sheet of steel 70 from which laminations are punched in accord with this method. For purposes of illustration, three laminations 71 are shown in full, as though the punching had been completed while the remainder of the sheet 70 is marked by dotted lines to denote further lamination locations. In practice, the punching of such laminations is done by several punches and dies in stages which successively form the bores, slots and holes and then sever the successive laminations; however, this figure illustrates the high degree of steel utilization which can in fact be achieved by proper relative positioning of the punches and dies.

As can be seen in FIG. 10, the laminations are shaped as previously described and use the substantially hexagonal, cornered slot concept. Multiple rows are punched from a single strip, the rows being staggered a distance equal to one-half of the width of the lamination. Each side corner of a lamination, as defined by the severing step, is nested at the dividing line between two successive laminations in the adjacent row, except for the outer side corners on the outer rows. This method permits a substantially higher rate of steel utilization than conventional methods. It is also noted that rotating the punch pattern for example by 90° so that the side corners of the hexagonal yoke run lengthwise of the strip would also be part of this invention since the same concept is used and since the amount of wasted steel at the strip edges is only slightly increased. In any case, essentially the full width of the steel sheet is utilized to form the laminations, only the corners 72 being wasted. Within each lamination area, only the material removed from the slots is wasted since the center can be used to form the armature laminations.

From the foregoing description, it can be readily seen that the illustrated laminations permit several advantages in the manufacture and operation of devices using D.C. electric motors. Among these, the more important are the very efficient use of steel permitted, the ease with which the motor and its associated brush rigging, mounting means, cooling passages, etc. may be accommodated within a variety of simple and inexpensive housing configurations and, most particularly, the improved motor performance both as to watts output and commutation which result from this structure. Despite the extensive development of these motors, this field construction and the tools and appliances which can be built around it are novel and unique and present significant advantages over the constructions previously known. Accordingly, while various specific embodiments of this invention have been illustrated and described, it will be clear to those skilled in the art that many changes or modifications may be made without departing from the true spirit and scope of this invention. For example, variations from a geometrically precise hexagon, which might result in inequality of the sides and/or of the included angles, could be made while still utilizing a substantially hexagonal design and thus using the unique teaching of this invention. Accordingly, it is intended that the appended claims cover all such changes and modifications as may embody the essential concepts disclosed herein.

I claim:

1. In a light-weight, hand-held appliance including an enclosure, an electric motor within said enclosure driving an output shaft, said motor having a two-pole wound field and a commutated armature, an improvement in said field comprising a substantially hexagonal yoke structure surrounding said armature; a pair of poles disposed within said yoke structure at diametrically opposed locations; each of said poles being located in the center of one side of said hexagonal yoke structure; a pair of pole tips extending from each of said poles; and a winding slot defined between each of said pole tips and the portion of said yoke structure adjacent thereto.

2. An appliance as claimed in claim 1 wherein the external configuration of said yoke structure provides six flat surfaces for locating said motor within said enclosure.

3. An appliance as claimed in claim 1 wherein said hexagonal yoke structure comprises six rectilinear sides, each of said sides being disposed at an included angle of 120° to the adjacent sides.

4. An appliance as claimed in claim 3 wherein each of said portions of said yoke structure which define said slots includes a corner between two of said rectilinear sides.

5. An appliance as claimed in claim 4 wherein the remaining two corners of said hexagonal yoke structure are provided with holes for receiving mounting means for said field.

6. An appliance as claimed in claim 1 wherein each of said portions of said yoke structure includes an internal corner between two sides of said hexagonal yoke structure.

7. An appliance as claimed in claim 6 wherein each of said poles comprises a throat interconnecting said yoke structure with said pole tips; and wherein said pole tips lie on a circle concentric with said shaft.

8. An appliance as claimed in claim 7 wherein said pole tips are tapered from a thick portion adjacent said yoke to a narrow portion at its other end.

9. An appliance as claimed in claim 6 wherein the remaining two corners of said hexagonal yoke structure are provided with holes for receiving mounting means for said field.

10. A portable, electric motor driven power tool comprising a streamlined, compact housing having a smooth, rounded configuration; an electric motor disposed within said housing, said motor having a two pole wound field, said field comprising a substantially hexagonal yoke structure and a pair of opposed poles within said yoke structure, each of said poles being located in the center of one side of said hexagonal yoke structure; a coil of wire wound on each of said poles; said hexagonal yoke structure being supported within said rounded housing at a plurality of circumferentially spaced locations; said rounded housing being spaced from said yoke structure along said sides of said yoke structure in which said poles are mounted, said spaces providing passages for cooling air to flow over the end turns of said coils.

11. A power tool as claimed in claim 10 wherein said hexagonal yoke structure comprises six rectilinear sides; said poles being centered respectively in two of said sides; said yoke structure having a flat surface at least along each of said two sides; said cooling passages being provided between said flat surfaces along two sides and said rounded housing.

12. A power tool as claimed in claim 11 wherein each of said rectilinear sides is disposed at an included angle of 120° to the adjacent sides.

13. A power tool as claimed in claim 12 wherein the external surface of said yoke structure is defined by the external edges of each of said rectilinear sides and by connecting portions extending between the ends of each adjacent pair of sides.

14. A power tool as claimed in claim 13 wherein the intersections of said rectilinear sides provide six internal corners; and wherein a portion of each side of said coils is located in a respective one of said corners at four of said intersections.

15. A power tool as claimed in claim 14 wherein the remaining two of said intersections include mounting means providing for retention of said field within said housing.

16. A power tool as claimed in claim 10 wherein said hexagonal yoke structure defines six corners thereof; four of said corners respectively receiving a portion of one side of each of said coils.

17. A power tool as claimed in claim 16 wherein the remaining two of said corners include mounting means providing for retention of said field in said housing.

18. In a two pole electric motor of the type including a wound coil field and a commutated armature rotatable therein, the improvement comprising a field adaptable for use within a variety of streamlined, compact housing configurations and having means for mounting and cooling of said field, said field including a substantially hexagonal yoke structure; a pair of opposed poles within said yoke structure, each of said poles extending inwardly from the center of one side of said hexagonal yoke structure; and a coil of wire wound on each of said poles; said means for mounting said field comprising a plurality of surfaces on the exterior of said yoke structure; and said means for cooling said field comprising flat surfaces extending along said sides of said yoke structure, whereby said field is adapted for mounting in a variety of small housing configurations.

19. An electric motor as claimed in claim 18 wherein said field comprises a pair of pole tips extending from each of said poles; and winding slots on each side of each of said poles defined by said pole tips and the adjacent yoke structure for receiving said coils; said adjacent yoke structure at each of said winding slots including a corner of said hexagonal yoke structure.

20. A motor as claimed in claim 19 wherein the two remaining corners of said hexagonal yoke structure are provided with holes for receiving mounting means for said field.

21. A field sub-assembly for a fractional-horsepower electric motor comprising a substantially hexagonal yoke structure having six rectilinear sides and six corners connecting each adjacent pair of said sides; a pair of opposed poles within said yoke structure, each of said poles comprising a throat located in the center of one of said sides and a pair of pole tips extending from said throat to be generally coaxial with said hexagonal structure; four winding slots each bounded by one side of each of said pole tips, one side of each of said throats, a part of each of said sides having a throat centered therein, one of said corners and a part of the next adjacent side; and a coil of wire associated with each of said poles and disposed in two of said winding slots.

22. A field lamination for a two-pole wound field electric motor comprising a substantially hexagonal yoke having six sides and six corners at the intersections of said sides; a pair of opposed poles extending internally of said yoke, each of said poles including a throat and a pair of pole tips; and four winding slots defined between each of said pole tips and one adjacent corner of said hexagonal yoke.

23. In a light-weight, hand-held appliance including an enclosure, an electric motor within said enclosure driving an output shaft, said motor having a two-pole wound field and a commutated armature, an improvement in said field comprising a substantially hexagonal yoke structure surrounding said armature; a pair of poles disposed within said yoke structure at diametrically opposed locations; each of said poles being located in the center of one side of said hexagonal yoke structure; a pair of pole tips extending from each of said poles; and a winding slot defined between each of said pole tips and the portion of said yoke structure adjacent thereto; each of said poles including a throat portion between said yoke structure and said pole tips; said throat portion having a minimum thickness between the bottoms of said winding slots of approximately twice the width in cross section of said yoke structure.

24. In a light-weight, hand-held appliance including an enclosure, an electric motor within said enclosure driving an output shaft, said motor having a two-pole wound field and a commutated armature, an improvement in said field comprising a substantially hexagonal yoke structure surrounding said armature; a pair of poles disposed within said yoke structure at diametrically opposed locations; each of said poles being located in the center of one side of said hexagonal yoke structure; a pair of pole tips extending from each of said poles; and a winding slot defined between each of said pole tips and the portion of said yoke structure adjacent thereto; said portions of said yoke structure adjacent each of said winding slots each including one of the corners defined between the sides of said hexagonal yoke structure whereby each of said winding slots includes the additional area provided by said corner; said corner being located within the lower half of the arcuate length of said winding slot as measured from the bottom of said slot outwardly toward the end of said pole tip.

25. In a light-weight, hand-held appliance including an enclosure, an electric motor within said enclosure driving an output shaft, said motor having a two-pole wound field and a commutated armature, an improvement in said field comprising a substantially hexagonal yoke structure surrounding said armature; a pair of poles disposed within said yoke structure at diametrically opposed locations; each of said poles being located in the center of one side of said hexagonal yoke structure; a pair of pole tips extending from each of said poles; and a winding slot defined between each of said tips and the portion of said yoke structure adjacent thereto; each of said poles including a throat portion between said yoke structure and said pole tips; said throat portion having a minimum thickness between the bottoms of said winding slots of approximately twice the width in cross section of said yoke structure; said portions of said yoke structure adjacent each of said winding slots each including one of the corners defined between the sides of said hexagonal yoke structure whereby each of said winding slots includes the additional area provided by said corner; said corner being located within the lower half of the arcuate length of said winding slot as measured from said throat portion outwardly toward the end of said pole tip.

* * * * *